United States Patent [19]

Thiewes et al.

[11] 4,188,644
[45] Feb. 12, 1980

[54] APPARATUS FOR CONTROLLING VIDEO TAPE PRESENTATION

[76] Inventors: Richard B. Thiewes, 132 S. Dakota Ave., Sioux Falls, S. Dak. 57101; Donald W. Nelson, 8114 Portland Ave. S., Bloomington, Minn. 55420

[21] Appl. No.: 924,445

[22] Filed: Jul. 13, 1978

Related U.S. Application Data

[63] Continuation of Ser. No. 753,834, Dec. 23, 1976, abandoned.

[51] Int. Cl.$^2$ ............................................. G11B 27/02
[52] U.S. Cl. ...................................................... 360/14
[58] Field of Search .................................. 360/13–14, 360/33, 7, 14, 70; 358/165, 139

[56] References Cited

U.S. PATENT DOCUMENTS

| | | | |
|---|---|---|---|
| 3,257,504 | 6/1966 | Bounsall | 360/14 |
| 3,424,865 | 1/1969 | Marchand | 358/165 |
| 3,450,832 | 6/1969 | MacLeod et al. | 360/70 X |

OTHER PUBLICATIONS

"Video Tape Deposition of the Medical Witness" by P. Tierney, Henerepin Lawyer, Jul.–Aug. 1972.

*Primary Examiner*—John H. Wolff
*Attorney, Agent, or Firm*—Burd, Braddock & Bartz

[57] ABSTRACT

A control system for video tape equipment operable to present video tape audio and visual testimony. The control system has a court monitor and a jury monitor connected to a video tape recorder. A control unit interposed in the cables between the video tape recorder and the monitors is operable by a video tape recoder operator to withhold both the audio and visual signals from the monitors. The control unit has a two-position switch having a first position wherein the court monitor and jury monitor simultaneously present the video tape testimony to the court and jury. The switch has a second position wherein the video tape recorder remains activated and both the audio and visual signals are withheld from the court and jury.

16 Claims, 6 Drawing Figures

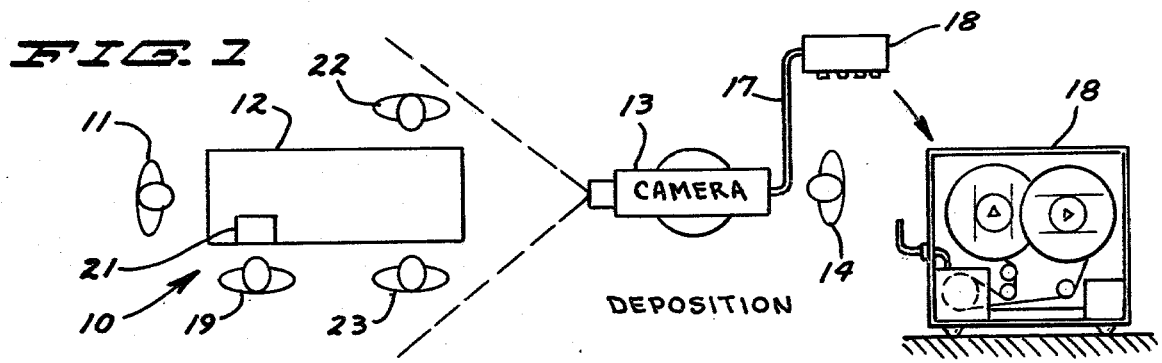
FIG. 1 — DEPOSITION
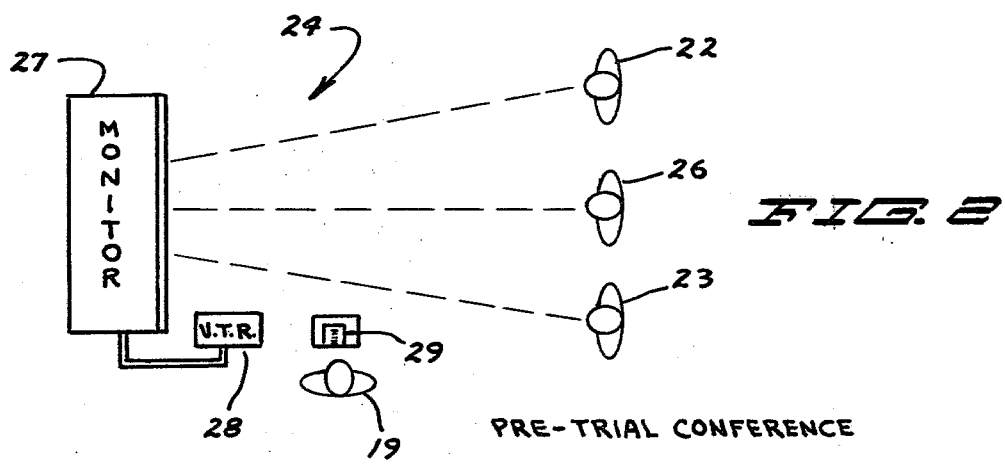
FIG. 2 — PRE-TRIAL CONFERENCE
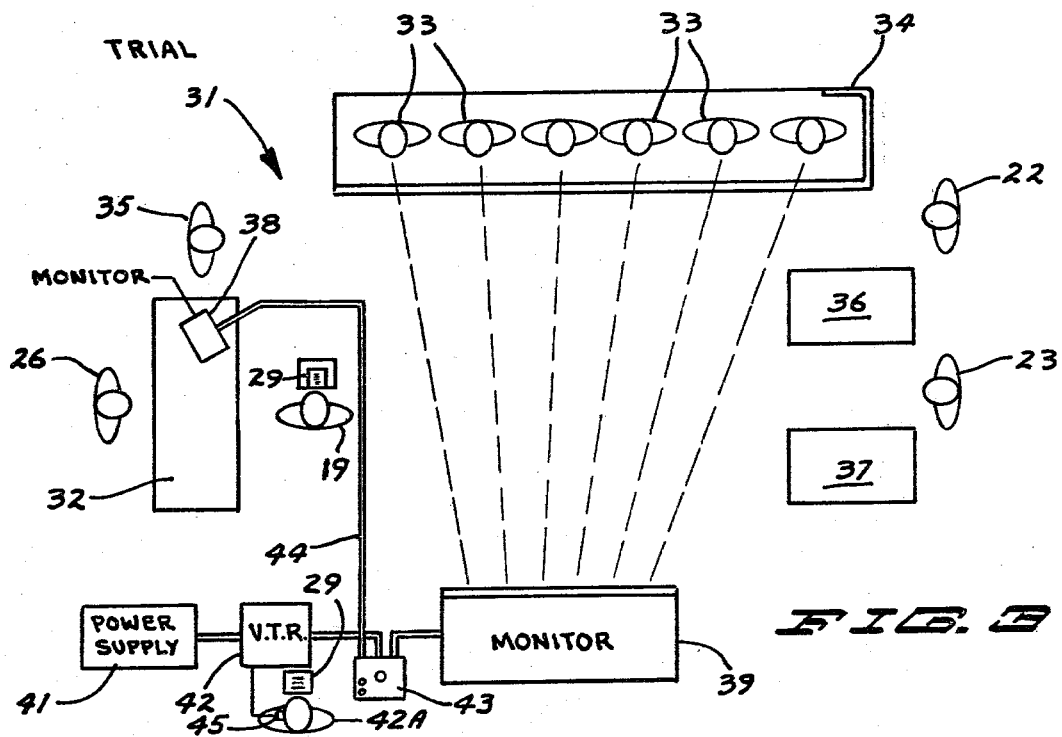
FIG. 3 — TRIAL

APPARATUS FOR CONTROLLING VIDEO TAPE PRESENTATION

This application is a continuation of U.S. application Ser. No. 753,834, filed Dec. 23, 1976, now abandoned.

BACKGROUND OF INVENTION

The Federal Rules of Civil Procedure [Rule 30(b)(4)] and state Rules of Civil Procedure provide that an oral deposition may be taken by video tape. When an audio-video recording of a witness is made, it is common practice that it be accompanied with a stenographic record. The stenographic record is used to handle the objections to the video deposition and assures a record in case of a faulty video tape recording. A video tape presentation of testimony allows a jury to see, hear and evaluate the witness. The jury observes the witness' manner and appearance, his frankness and sincerity, and his demeanor and responsiveness to the questions.

The video tape deposition is taken in places outside of the courtroom, such as a doctor's office and like places. In many situations, the deposition is accompanied by demonstrative evidence as graphs, diagrams, schematic drawings, charts, and other visual materials. The video tape is particularly effective when demonstrative evidence is used because the witness can mark and demonstrate on the exhibits in the same manner that he would do during the course of the trial. The video tape camera operator can zoom in on the exhibits so that the attention of the jury is brought directly to the exhibit.

The video tape deposition transcript is reviewed in the pre-trial. Objections to all or portions of the transcript are noted and ruled on by the court. The objectionable parts of the video tape which have been sustained by the court must be withheld from the jury. It is conventional practice for the video tape operator or reporter to make a second video tape, editing out the sustained objectionable parts of the original video tape. The original video tape is retained in its original form in the event that there was error in the court's ruling on the inadmissibility or admissibility on portions of the tape or the entire video tape. The construction of a second video tape is a timely and costly procedure. It is also a practice to have the reporter turn off the monitors to delete the objectionable portions of the tape during a trial. When the monitor or monitors are turned on, there is a delay in forming the image on the monitor and in some instances the image must be readjusted. There is also a flickering of the image displayed by the monitor when it is turned on. This interrupts the trial and is annoying to the jurors. The judge is provided with a second monitor to view and hear the audio and visual presentation as it is presented to the jury.

PRIOR ART

U.S. Pat. No. 2,927,154, Wolfe et al.
U.S. Pat. No. 3,026,369, Lohmann et al.
U.S. Pat. No. 3,030,441, Nemeth
U.S. Pat. No. 3,257,504, Bounsall
U.S. Pat. No. 3,427,398, Hemmerling et al.
U.S. Pat. No. 3,450,832, MacLeod et al.
U.S. Pat. No. 3,506,793, Inque et al.
U.S. Pat. No. 3,974,522, Fukatsu et al.

The above patents are directed to apparatus and method for editing magnetic recordings of video signals of television tapes. In this equipment, the signals on the tapes are deleted or altered to produce a final tape.

SUMMARY OF INVENTION

The invention is directed to a method and apparatus for controlling the visual and audio signals directed to one or more monitors used to present information in video tape form to an audience, as a jury. More particularly, the invention is directed to a control circuit operable to delete audio and visual parts of a video tape from a monitor or monitors and retain the private audio signals for the video tape recorder or video tape recorder operator. The control system has a circuit for simultaneously operating the court monitor and jury monitor to present the audio and visual evidence to both the court and the jury. The circuit contains a two-position switch operable by the video tape recorder operator to cut off or withhold the visual and audio signals from the monitors without changing the private audio signal to the video tape recorder operator. The video tape recorder operator follows the transcript of the deposition. When the portions of the transcript that were objected to and ruled as inadmissible in the pre-trial conference are about to be presented on the monitors, the switch is actuated to its second cut off position to this portion from the monitors. The monitors remain activated or hot since the switch does not effect the AC power to the monitors. When the objectionable portions of the testimony have been completed, the video tape recorder operator actuates the switch of the control unit to return it to its normal or first on position. The audio and visual signals are displayed by the monitors without a flicker or readjusting the image on the monitor, and without a delay in rewarming the monitors.

An object of the invention is to provide a control system for video tape apparatus that permits the original video tape deposition to be presented to an audience, as a jury, with the objectionable portions withheld from the jury. A further object of the invention is to provide a control for video tape equipment that withholds the audio and visual signals from a plurality of monitors while maintaining operating power to all the monitors. A further object of the invention is to provide a control circuit for video tape displaying equipment that is operable to sequentially withhold audio and visual signals from a monitor and permitting audio and visual signals to the monitor without effecting the audio output or causing a flickering of the image on the monitor. Yet another object of the invention is to provide a control for video tape displaying equipment that is conveniently and readily operable by the video tape recorder operator. Another object of the invention is to provide a control unit for withholding audio and visual signals from one or more video monitors usable with all types of video tape equipment, including black and white and color equipment. A further object of the invention is to provide a video tape monitor control system that has a video tape recorder that continues to operate or play under all conditions of a control switch operable to allow and withhold audio and visual signals from one or more video monitors. These and other objects and advantages of the invention are disclosed in the following description and drawings.

IN THE DRAWINGS

FIG. 1 is a diagrammatic view of a video tape deposition of a witness;

FIG. 2 is a diagrammatic view of a pre-trial conference of the video tape deposition;

FIG. 3 is a diagrammatic view of a jury trial courtroom wherein the video tape deposition is shown to the jury;

DESCRIPTION OF PREFERRED EMBODIMENT

Figure 4:
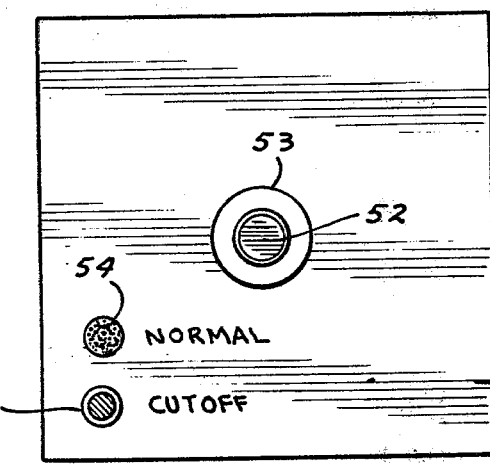
FIG. 4 is a top plan view of the control unit for editing the video tape deposition.

Referring to FIG. 1, a witness 11 is being deposed on behalf of a party to a lawsuit. Witness 11 is shown located behind a table 12 in front of a video camera 13. Video camera operator 14 focuses the camera 13 on witness 11 to record the visual and audio information of witness 11. Camera 13 is connected with cable 17 to a video tape recorder 18. Recorder 18 is shown as a block diagram and as a diagrammatic representation of a recorder. The video tape camera 13 and recorder 18 function together to record the visual and oral testimony of the witness. In addition, the tape reflects the manner and appearance of the witness, his age and experience, as well as the frankness or sincerity or lack thereof. The video tape presents a total picture of the deposition of the witness so that the jury can make an evaluation of the witness to determine whether the witness is to be believed and the weight of his or her testimony.

The video deposition can be taken in any location where there is suitable light to illuminate witness 11 and an operating environment for camera 13. For example, a doctor's office, a machine shop, a shopping center, and like places. In some cases, the video deposition is taken in a specially equipped room that is specifically lighted for video camera 13 and has optimum acoustic characteristics.

In addition to the visual and audio recording of the testimony of witness 11 by camera 13, a reporter 19 stenographically takes the written testimony of witness 11 and makes a written transcript. Attorneys 22 and 23 representing the parties are located opposite sides of table 12. Additional attorneys can be present. During the deposition, an attorney, i.e. attorney 22, propounds a question to witness 11. Witness 11 orally answers the question. In addition, witness 11 may be asked to demonstrate the operation of a structure, machine, or the location of a personal injury. During the deposition, the attorneys can raise objections to questions and answers or to portions of or all of the deposition. The objections are made of record by reporter 19 and recorded on the video tape made by camera 13 and video tape recorder 18.

Prior to the trial, the court under the Rules of Civil Procedure requires a pre-trial conference. At this conference, the judge rules on the objections to portions of or all of the video tape deposition. The judge normally considers the written transcript and either sustains or overrules the objections. In some cases, the judge views the video tape deposition. FIG. 2 shows a diagrammatic view of a pre-trial conference, where judge 26 views the video tape deposition. This viewing is not necessary with the control system of the present invention because the original tape is not cut, spliced, altered, or changed. The tape remains in its original condition as taken in the deposition of FIG. 1. The original tape can be viewed again and used in a subsequent trial since the integrity of the tape is preserved. In FIG. 2, reporter 19 is present to record any rulings or objections to the testimony. The pre-trial conference is held in the presence of judge 26 and one or more attorneys 22 and 23 representing the parties to the lawsuit. During the pre-trial conference, judge 26 rules on the various motions made to the video tape testimony from the written transcript. Reporter 19 will indicate on the written transcript 29 the parts of the video tape that have been held inadmissible.

The current practice is for the video tape recorder operator to then make a second video tape from the original video tape. The original video tape is preserved for purposes of appeal in the event that there was an error on the rulings of the admissibility or inadmissibility of portions of the video tape testimony. The second tape is spliced together to form a new video tape. This is a costly and time-consuming practice. When the second video tape is spliced together, there is a flickering of the picture on the video monitor when the tape is shown. The picture flicker is a distraction to the viewers. In some cases, the image on the monitors must be readjusted thereby delaying the trial. The method and apparatus for controlling the video monitors of the invention overcomes the need for making a second video tape, and eliminates image flickering and the need for image readjustment.

Referring to FIG. 3, there is shown a diagrammatic view of a typical jury trial courtroom indicated generally at 31. Judge 26 is located behind bench 32 and is faced by attorneys 22 and 23. The jury 33, seated in jury box 34, is in close proximity to the witness stand 35 and faces monitor 39. The witness on witness stand 35 normally responds to questions in direct examination and cross-examination by trial attorneys 22 and 23 seated at counsel tables 36 and 37. Objections can be raised by the attorneys of the questions. These objections are ruled on by judge 26. The entire proceeding is recorded by reporter 19.

During the course of the trial, the video tape deposition is introduced into evidence. The video tape deposition is displayed to judge 26 through a first monitor 38 and displayed to jury 33 through a second monitor 39. Monitors 38 and 39 are conventional units having viewing screens for displaying images and audio speakers. Monitor 39 is located in a position where it can be viewed by all of the participants of the trial and particularly jury 33 as well as trial attorneys 22 and 23. Monitor 38 can only be viewed by judge 26. Objections have been by this time ruled on by judge 26 at the pre-trial conference. When a portion of the video testimony is to be withheld, video tape recorder operator 42A actuates the control means 43 to blank out or withhold both the visual and audio information of the testimony displayed on monitor 38 and 39. After the objectionable material has been withheld from the judge and jury, video tape recorder operator 42A reactivates the control unit 43 so that monitors 38 and 39 will instantaneously continue the video tape testimony.

Referring to FIG. 3, monitors 38 and 39 are connected to a power supply 41, as conventional AC power. Power supply 41 operates video tape recorder 42. Recorder 42 supplies both visual and audio signals to a control means 43 located adjacent to video tape recorder operator 42A. Cables 44 connect video tape recorder 42 with control means 43 and monitors 38 and 39. Control means 43 is operable to control the audio and visual operation of monitors 38 and 39. The audio testimony is transmitted to video tape recorder operator 42A via conventional head set or ear phones 45, by cable to video tape recorder 42. Ear phones 45 are private listening means or devices which confine the audio testimony to the privacy of video tape recorder operator 42A.

Figure 5:
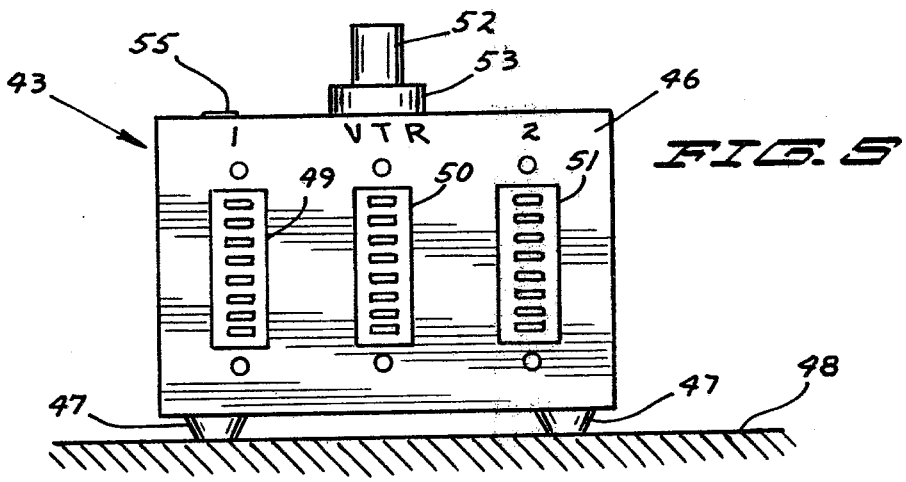
FIG. 5 is a rear elevational view of the control unit of FIG. 4.

Referring to FIGS. 4 and 5, control means 43 has a generally box-shaped housing 46. A plurality of feet 47 attached to the bottom of housing 46 supports housing 46 on a surface 48, as a table, bench, or the like. As shown in FIG. 5, the back of housing 46 has three electrical receptacles or connectors 49, 50, and 51. Additional connectors can be mounted on housing 46. Suitable electrical plugs connected to cables 44 plug into connectors 49, 50, and 51. Connector 49 is for the cable leading to monitor 38. Connector 50 is a video tape recorder input connector. Connector 51 receives the plug for second monitor 39. A movable switch actuator 52 is secured to the top of housing 46 with a single mount 53. Actuator 52 is part of a two-position switch. Preferably, the switch is an eye ball double pole, double throw unit having a single hole panel mount. Actuator 52 has a central colored plunger surrounded by a transparent cup-shaped member. When actuator 52 is in a first or normal position, the colored plunger is not visible. The plunger in its down position is a first indicator means providing a visual reading of the first position of actuator 52. Movement of actuator 52 to its second or cut off position, locates colored plunger in a position where it is visible. The plunger in its up and visible position is a second indicator means providing a visual reading of the second position of actuator 52. Other types of switch position indicators, as lights, electrical devices, mechanical devices, or combinations of electrical and mechanical devices, can be used. Indicator markings 54 and 55 located on the top of housing 46 adjacent switch actuator 52 provides visual reference as to the condition of the switch, i.e. normal or cut off.

Figure 6:
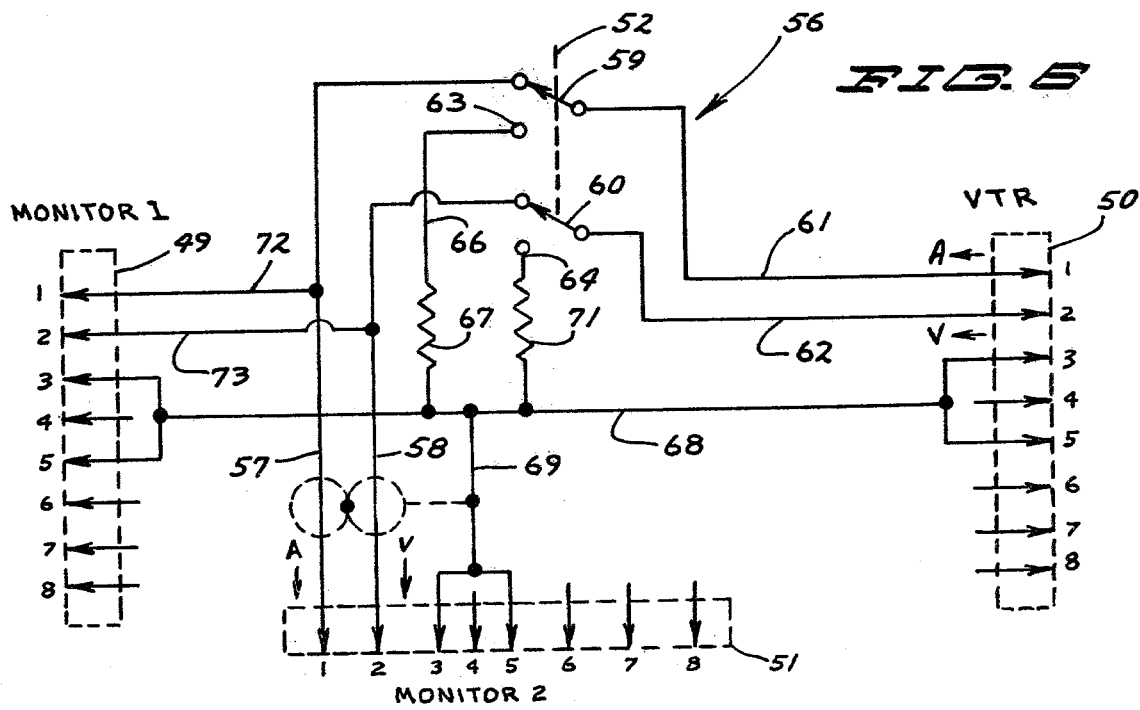
FIG. 6 is a circuit diagram of the control circuit for controlling the monitor view by the jury.

Referring to FIG. 6, there is shown a circuit diagram of the electrical circuit indicated generally at 56 controlled by switch comprising actuator 52 and elements 59 and 60. An audio input line 61 and visual input line 62 are normally connected to switching elements 59 and 60 respectively. The signals through lines 61 and 62 are carried via lines 57 and 58 to the monitor receptacle 51. Cable 44 carries the signals to monitor 39. Lines 72 and 73 connected to lines 57 and 58 carry the signals to monitor receptacle 49. One of cables 44 carry these signals to monitor 38. The circuit is completed via lines 68 and 69 connected to both monitor receptacles 49 and 51 and video tape recorder 50. When switching elements 59 and 60 are in the position shown in FIG. 6, both monitors 38 and 39 are operable to visually and audially display and transmit the testimony on the tape to the court, and jury.

Movable switching elements 59 and 60 are moved in response to operation of actuator 52 into engagement with contacts 63 and 64. Video tape recorder 42 continues to operate. Contact 63 is connected to a line 66 having a resistor 67. Resistor 67 is to line 68. Contact 64 is connected via a resistor 71 to line 68. Resistors 67 and 71 are line terminating means which effect a more constant impedance load to the video tape recorder 42 for noise suppression. The impedance load on the audio and visual circuits due to monitors and resistors 67 and 71 is substantially the same. The switching from monitors 38 and 39 to resistors 67 and 71 does not change the audio level of the audio signal to video tape recorder operator 42A. The switching from monitors to resistors 67 and 71 withholds both audio and visual signals from monitors 38 and 39. Resistors 67 and 71 connected to line 68 maintains the signal ground paths when the switch is in the cut-off position. Thus, monitors 38 and 39 remain on so that they do not have to warm up before the images appear on the monitor screens. The images appear instantaneously with the switch returned to its normal position. The images do not flicker and the monitors do not have to be readjusted.

Resistors 67 and 71 may have the following component values: resistor 67–1 K ohms and resistor 71–75 ohms. The following component value is given by way of example, as other values can be used to provide a functioning system.

While there is shown and described an apparatus and method for presenting video tape information to a special audience, i.e. a jury, it is intended that the apparatus and method can be used with other types of audiences. Also, changes in the structures, types of switches and circuits can be made by those skilled in the art without departing from the invention. For example, the control unit 43, can be located in a position where there is the least distraction to the trial proceedings. Cables 44 extend to the remotely located control unit 43. Also, control unit 43 can have a foot-operated switch. Actuator 52 can be of a type and size to engage the foot of video tape recorder operator 42A. Control unit 43 may be equipped with an electronic signal receiver which when activated actuates the switch of the control unit. The video tape recorder operator 42A would have a portable electronic signal sender turned to the frequency of the receiver. Actuation of the sender would activate the receiver thereby operating the switch of the control unit.

The control unit can be used with one monitor, two monitors, or more than two monitors. Additional monitor receptacles can be connected to the circuit of FIG. 6 and controlled by switches 52, 59, and 60.

The invention is defined in the following claims.

The embodiments of the invention in which an exclusive property or privilege is claimed are defined as follows:

1. An apparatus for presenting a video tape deposition having audio and visual information to a court and jury comprising: a video tape unit adapted to be connected to a power supply, a jury monitor, a court monitor, each of said monitors having a viewing screen and means for audibly transmitting audio information, and means electrically coupling said monitors to the video tape unit whereby the audio and visual information on the video tape is simultaneously displayed on the jury and court monitors, said means electrically coupling said monitors to the video tape unit having an electrical audio circuit connecting the video tape unit with the court and jury monitors, an electrical video circuit connecting the video tape unit with the court and jury monitors, a first resistor interposed in the audio circuit, a second resistor interposed in the video circuit, and a two position switch means having a first position to couple the first and second resistors to the court and jury monitors to withhold the audio and visual information from the monitors while maintaining a power supply to the monitors, said first and second resistors providing impedance loads substantially the same as that of said monitors when said switch means is in the first position, whereby the monitors are in an operable power on condition when the switch means is in the first position, said switch means having a second position by-passing said first and second resistors whereby the electrical audio and video circuits function to simultaneously present audio and visual information on both monitors from said video tape unit to the court and jury.

2. The apparatus of claim 1 including: a housing enclosing said first and second resistors and supporting said two-position switch means.

3. The apparatus of claim 2 including: first indicator means mounted on the housing and cooperating with the switch means providing an indication of the first position of the switch means, and second indicator means mounted on the housing and cooperating with the switch means providing an indication of the second position of the switch means.

4. The apparatus of claim 1 including: first indicator means cooperating with the switch means for providing an indication of the first position of the switch means, and second indicator means cooperating with the switch means for providing an indication of the second position of the switch means.

5. An apparatus for presenting video tape audio and visual information to a first audience and a second audience comprising: a video tape unit adapted to be connected to a power supply, a first audience monitor, a second audience monitor, each of said monitors having a viewing screen and means for audibly transmitting audio information, means electrically coupling the monitors to the video tape unit whereby the audio and visual information is simultaneously displayed on said monitors, said means electrically coupling the monitors to the video tape unit including an electrical circuit connecting the video tape unit with the first and second monitors, said electrical circuit having line terminating means connected to the video tape unit to provide a constant line termination, and a switch means having a first position operatively coupling the line terminating means to the first and second monitors whereby audio and visual information is withheld from the first and second monitors while a power supply is maintained to both the first and second monitors, said line terminating means providing impedance loads substantially the same as that of said monitors when said switch means is in the first position, to maintain said first and second monitors in an operable on condition when the switch means is in the first position, said switch means having a second position to by-pass said line terminating means and concurrently connect said first monitor and second monitor with the video tape whereby audio and video information on the tape is simultaneously transmitted from and displayed on the first and second monitors.

6. The apparatus of claim 5 wherein: the electrical circuit has an audio circuit and video circuit, said line terminating means including a first resistor interposed in the audio circuit and a second resistor interposed in the video circuit, both of said resistors being permanently connected to the switch.

7. The apparatus of claim 5 including: a housing enclosing said line terminating means and supporting said switch.

8. The control means of claim 7 including: a first indicator means mounted on the housing and cooperating with the switch providing an indication of the first position of the switch and a second indicator means mounted on the housing and cooperating with the switch providing an indication of the second position of the switch.

9. The apparatus of claim 5 including: first indicator means cooperating with the switch to provide an indication of the first position of the switch and a second indicator means cooperating with the switch to provide an indication of the second position of the switch.

10. The apparatus of claim 5 wherein: the electrical circuit has an audio circuit and a video circuit, and the line terminating means includes a first resistor interposed in the audio circuit and a second resistor interposed in the video circuit, said first and second resistors providing impedance loads substantially the same as that of said monitors when said switch is in said first position.

11. An apparatus for presenting a video tape deposition having audio and visual information to a court and jury comprising: a video tape recorder unit adapted to be connected to a power supply, a jury monitor, a court monitor, each of said monitors having means for displaying visual information on a viewing screen, and means for audibly transmitting audio information, means electrically coupling said monitors to said video tape unit whereby audio and visual information on a video tape in said unit is simultaneously displayed on the jury and court monitors, said means electrically coupling said monitors to said video tape unit including two-position switch control means for selectively withholding audio and visual information from said monitors while continuing transport of a video tape carrying said information in said video tape unit and while maintaining a power supply to said monitors to keep them in active power on condition when said switch control means is in a first position, or simultaneously presenting audio and visual information on said monitors from said video tape unit to the court and jury with said switch control means in a second position, said switch control means when in said first position including line terminating resistant elements providing impedance loads substantially the same as that of said monitors when said switch is in said first position.

12. The apparatus of claim 11 wherein: said means electrically coupling said monitors include an electric video circuit and an electric audio circuit, said line terminating resistant elements including a first resistor interposed in the audio circuit and a second resistor interposed in the video circuit.

13. The apparatus of claim 12 including: a housing enclosing said first and second resistors and supporting said switch control means.

14. The apparatus of claim 13 including: first indicator means mounted on the housing and cooperating with the switch control means to provide an indication of the first position of the switch control means and a second indicator means mounted on the housing and cooperating with the switch control means to provide an indication of the second position of the switch control means.

15. The apparatus of claim 11 including: a housing accommodating the line terminating resistant elements and supporting the switch control means.

16. The apparatus of claim 11 including: first indicator means cooperating with the switch control means to provide an indication of the first position of the switch control means, and second indicator means cooperating with the switch control means to provide an indication of the second position of the switch control means.

* * * * *

UNITED STATES PATENT AND TRADEMARK OFFICE
CERTIFICATE OF CORRECTION

PATENT NO. : 4,188,644
DATED : February 12, 1980
INVENTOR(S) : Richard B. Thiewes et al It is certified that error appears in the above-identified patent and that said Letters Patent are hereby corrected as shown below:

On the title page, under "Other Publications", line 2, "Henerepin" should be --Hennepin--.

On the title page, in the Abstract, line 7, "recoder" should be --recorder--.

Column 7, line 48, after "tape", --unit-- is omitted.

Signed and Sealed this

Twenty-seventh Day of May 1980

[SEAL]

Attest:

SIDNEY A. DIAMOND

Attesting Officer

Commissioner of Patents and Trademarks